(12) United States Patent
Koudelka et al.

(10) Patent No.: US 7,801,407 B2
(45) Date of Patent: Sep. 21, 2010

(54) OPTICAL INSPECTION OF OPTICAL SPECIMENS SUPPORTED BY A WORK HOLDER

(75) Inventors: Lubomir Koudelka, Shoreview, MN (US); Peter David Koudelka, St. Paul, MN (US)

(73) Assignee: Promet International, Inc., Shoreview, MN (US)

( * ) Notice: Subject to any disclaimer, the term of this patent is extended or adjusted under 35 U.S.C. 154(b) by 0 days.

(21) Appl. No.: 12/389,683

(22) Filed: Feb. 20, 2009

(65) Prior Publication Data

US 2009/0185172 A1     Jul. 23, 2009

Related U.S. Application Data

(63) Continuation of application No. 11/679,433, filed on Feb. 27, 2007, now Pat. No. 7,505,652.

(60) Provisional application No. 60/779,014, filed on Mar. 3, 2006.

(51) Int. Cl.
*G02B 6/00* (2006.01)
*G01N 21/00* (2006.01)

(52) U.S. Cl. .................... 385/137; 356/73.1; 356/237.4; 356/237.5

(58) Field of Classification Search ................. 385/137; 356/73.1, 237.4, 237.5
See application file for complete search history.

(56) References Cited

U.S. PATENT DOCUMENTS

| | | |
|---|---|---|
| 5,179,419 A | 1/1993 | Palmquist et al. |
| 5,459,564 A | 10/1995 | Chivers |
| 5,535,002 A | 7/1996 | Csipkes et al. |
| 5,543,915 A | 8/1996 | Csipkes et al. |
| 5,600,439 A | 2/1997 | Csipkes et al. |
| 5,636,020 A | 6/1997 | Csipkes et al. |
| 5,862,250 A | 1/1999 | Csipkes |
| 5,898,494 A | 4/1999 | Csipkes |
| 5,917,595 A | 6/1999 | Norland et al. |
| 6,052,505 A | 4/2000 | Bice et al. |
| 6,215,555 B1 | 4/2001 | Chivers |
| 6,466,310 B2 | 10/2002 | Nguyen et al. |
| 6,736,702 B2 | 5/2004 | Minami |
| 6,786,650 B2 | 9/2004 | Dean, Jr. et al. |
| 6,831,738 B2 | 12/2004 | Rogers et al. |
| 6,954,274 B2 | 10/2005 | Sasaki et al. |
| 6,989,895 B2 | 1/2006 | Buzzetti |
| 2002/0109831 A1 | 8/2002 | Van Nguyen et al. |
| 2003/0048435 A1 | 3/2003 | Nguyen et al. |
| 2003/0053043 A1 | 3/2003 | Nguyen et al. |
| 2003/0128939 A1 | 7/2003 | Nguyen et al. |
| 2005/0206889 A1 | 9/2005 | Koudelka et al. |

*Primary Examiner*—Jerry T Rahll
(74) *Attorney, Agent, or Firm*—Leanne Taveggia Farrell; Westman, Champlin & Kelly, P.A.

(57) ABSTRACT

An optical inspection system includes an optical inspection device and an interface. The optical inspection device houses optical imaging components that acquire microscope visual images and acquire interference fringe images of a plurality of optical specimens along an optical path. The optical path is located along an optical axis of the optical inspection device. The interface is coupled to the optical inspection device and is configured to removably engage a polishing work holder that supports the plurality of optical specimens. The interface allows an optical specimen axis of each of the plurality of optical specimens and the optical axis of the optical inspection device to be aligned.

15 Claims, 5 Drawing Sheets

OPTICAL INSPECTION OF OPTICAL SPECIMENS SUPPORTED BY A WORK HOLDER

CROSS-REFERENCE TO RELATED APPLICATION

The present application is a continuation of and claims priority of U.S. patent application Ser. No. 11/679,433, filed Feb. 27, 2007 which is based on and claims the benefit of U.S. provisional patent application Ser. No. 60/779,014, filed Mar. 3, 2006, the contents of which is hereby incorporated by reference in their entirety.

BACKGROUND

An optical fiber connector includes a ferrule, which is a cylindrical ceramic element, having a centrally mounted optical fiber. An optical fiber connector also includes a connector housing which is physically mounted to a fiber optic cable and the ferrule. Optical fibers and ferrules in fiber optic connectors require a high quality, optical grade endface surface to maximize coupling efficiency and ensure proper operation. Generally a fiber endface has a desirable geometry or topography, such as a desirable radius of curvature, apex offset and fiber height. The fiber endface also has an acceptable surface quality free of any undesirable surface defects.

The proper surface quality and topography of a fiber endface in a fiber connector is achieved through an optical polishing process. During this process a plurality of fiber optic connectors or fiber optic connector ferrules are mounted in a polishing plate or work holder. The work holder determines the position and polish angle of the ferrules during the polishing process. The connectors are mounted in a way such that the endface of the ferrule protrudes slightly past the bottom surface of the polishing plate. The polishing plate is repetitively moved over an abrasive surface, or pad, in a systematic manner. The abrasive pad removes material from the protruding portion or endface of the ferrule. The desired ferrule endface geometry and surface quality is achieved by changing the polishing variables such as the type of abrasive material used, pressure and speed applied and the time of polishing.

There are a large number of factors that influence the end result of the polishing process. Examples of these factors are tool wear, temperature variations, material variations, external physical contaminants and skill of the operator. Depending on the level of control exercised over these variables, the result of the polishing process can vary significantly between iterations. Therefore, to ensure desired polishing results, it is necessary to inspect the endface quality and test the topography of the fiber connector during and after the polishing process.

The surface quality of the fiber endface can be evaluated using an optical microscope to magnify any surface defects that might be present on the fiber endface surface. The fiber endface geometry can be measured using several different contact, or non-contact, three-dimensional surface mapping methods. For example, optical interferometry is a very practical and accurate measurement technique and is commonly used for inspecting endfaces.

In general, testing and inspecting the connector endfaces using conventional means requires that each ferrule, or connector, be physically removed from the work holder and placed into a separate testing instrument for evaluation. If the ferrule endface does not have the required parameters it must be re-inserted back into the polishing plate for further processing or considered rejected. It may be necessary to repeat this testing procedure several times with each ferrule during the fabrication process.

Such testing procedures require excessive material handling of the sensitive ferrules and can be very time consuming. Furthermore, the removal and subsequent re-insertion of the ferrule from the polishing plate may introduce minute positional changes and other variables that further impede the predictability of the polishing process. It is generally undesirable to remove the ferrule from the polishing tool until the polishing process is complete.

SUMMARY

An optical inspection system includes an optical inspection device and an interface. The optical inspection device houses optical imaging components that acquire microscope visual images and acquire interference fringe images of a plurality of optical specimens along an optical path. The optical path is located along an optical axis of the optical inspection device. The interface is coupled to the optical inspection device and is configured to removably engage a polishing work holder that supports the plurality of optical specimens. The interface allows an optical specimen axis of each of the plurality of optical specimens and the optical axis of the optical inspection device to be aligned. In one embodiment, the polishing work holder is rotated to align the optical specimens with the optical axis. In one embodiment, the optical inspection device is rotated to align the optical axis with the optical specimens.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments of the disclosure pertain to inspection of endfaces of optical fiber connectors that are mounted to a polishing work holder. Embodiments of the disclosure improve the speed, accuracy and dependability of fiber connector endface polishing processes by allowing the visual inspection and three-dimensional topographical measurements of fiber connector endfaces without the need to remove the connectors from the polishing plate or polishing work holder that supports the connectors during polishing.

A polishing work holder is configured to support a plurality of optical fiber connectors or fiber optic connector ferrules for polishing. Such optical fiber connector or fiber optic connector ferrules are example optical specimens. Optical fibers in fiber optic connectors require a high quality, optical grade endface surfaces to maximize coupling efficiency and to ensure proper operation with other fiber optic connectors. Generally a fiber endface has a desirable geometry or topography, as well as an acceptable surface quality free of any undesirable surface defects.

The proper surface quality and topography of each fiber endface for each of the plurality of optical fiber connectors supported in a polishing work holder is achieved through an optical polishing process of the fiber and ferrule assembly or of the connector. Many different types of connector styles can be supported by a polishing work holder for polishing. For example, ST, SC, FC, LC and other industry standard connectors can be supported. The polishing work holder also determines the position and polish angle of the ferrules during the polishing process, such as straight polish (PC) and angle polish (APC) versions.

The connectors are mounted and supported in a polishing work holder in such way that the endfaces of the ferrules protrude slightly past a bottom surface of the polishing work holder. During polishing, the polishing work holder is repetitively moved over an abrasive surface, or pad, in a systematic manner. The abrasive pad removes material from the optical specimen supported by the polishing work holder. There are a large number of factors that influence the end result of the polishing process. Examples of these factors are tool wear, temperature variations, material variations, external physical contaminants and skill of the operator. Depending on the level of control exercised over these variables, the result of the polishing process can vary significantly between iterations. Therefore, to ensure desired polishing results, it is necessary to inspect the endface quality and test the topography of the fiber connector throughout the polishing process.

Figure 1:
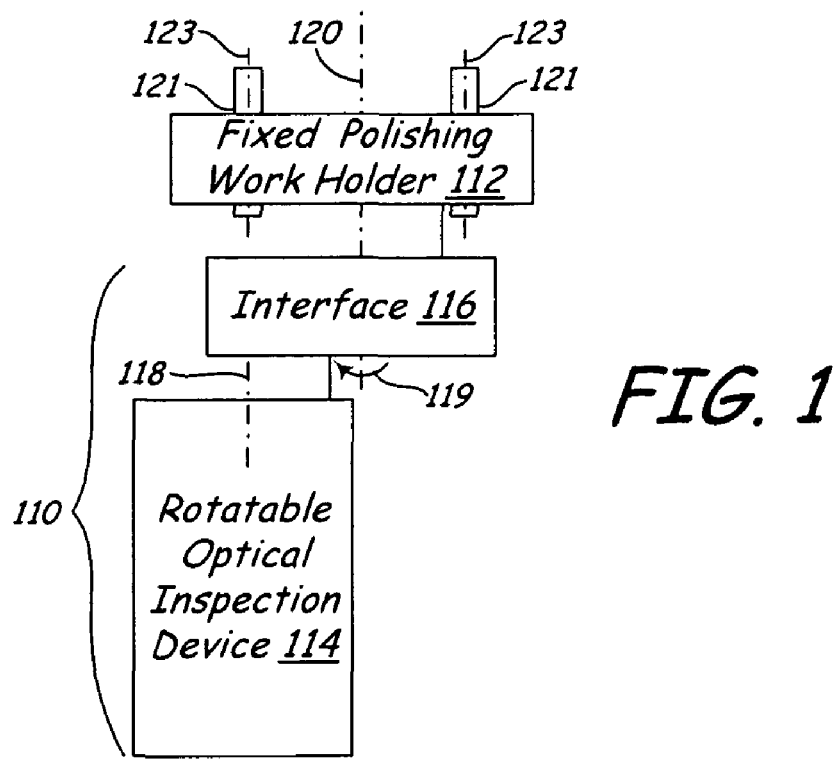
FIG. 1 is a schematic block diagram of an optical inspection system coupled to a polishing work holder under one embodiment.

FIG. 1 is a schematic block diagram of an optical inspection system 110 coupled to a polishing work holder 112 under one embodiment. Optical inspection system 110 includes an optical inspection device 114 and an interface 116. Optical inspection device 114 includes an optical axis 118 that is positioned along its optical path. Polishing work holder 112 includes a work holder central axis 120 and a plurality of optical specimens 121 (of which FIG. 1 illustrates two such specimens) each having a specimen axis 123 that are radially spaced about work holder central axis 120. Interface 116 is coupled to optical inspection device 114 and is capable of engaging with polishing work holder 112 such that the plurality of optical specimens 221 supported by polishing work holder 112 can be inspected by optical inspection device 114.

Optical inspection system 110 is placed in close proximity to a polishing machine. At any time during the polishing process, an operator can remove polishing work holder 112 containing in-process optical specimens 121 from the polishing machine and engage it with interface 116. Optical inspection device 114 is used to complete a visual evaluation of surface quality of the optical specimens contained by the polishing work holder 112 as well as performing a three-dimensional topographical measurement of the optical specimens. Optical specimens that meet specified surface requirements can be removed from polishing work holder 112. Polishing work holder 112, which contains the remaining optical specimens that require further processing, is placed back in the polishing machine.

In FIG. 1, polishing work holder 112 is fixedly attached to interface 116, while optical inspection device 114 is rotatable relative to polishing work holder 112 and interface 116. Optical inspection device 114 is rotatable about work holder central axis 120 as indicated by arrow 119 such that optical axis 118 can come into alignment with each specimen axis 123 of the plurality of optical specimens 121 supported on polishing work holder 112. In the FIG. 1 configuration, optical inspection device 114 can be moved about work holder axis 120 to all of the optical specimen positions on polishing work holder 112 while polishing work holder 112 is fixed.

Figure 2:
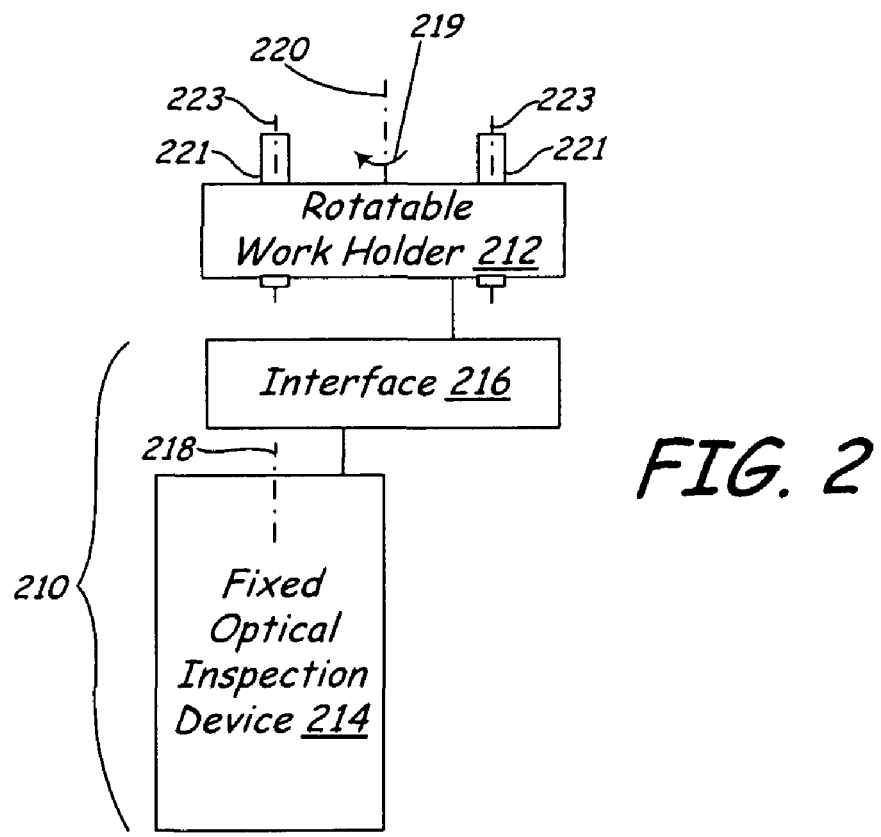
FIG. 2 is a schematic block diagram of an optical inspection system coupled to a polishing work holder under one embodiment.

FIG. 2 is a schematic block diagram of an optical inspection system 210 coupled to a polishing work holder 212 under one embodiment. Optical inspection system 210 includes an optical inspection device 214 and an interface 216. Optical inspection device 214 includes an optical axis 218 that is positioned along its optical path. Polishing work holder 212 includes a work holder central axis 220 and a plurality of optical specimens 221 (of which FIG. 2 illustrates two such specimens) each having a specimen axis 223 that are radially spaced about work holder central axis 220. Interface 216 is coupled to optical inspection device 214 and is capable of engaging with polishing work holder 212 such that the plurality of optical specimens 221 supported by polishing work holder 212 can be inspected by optical inspection device 214. Optical specimens supported in polishing work holder 212 will be in the process of polishing or have already undergone one or more polishing processes.

Like optical inspection system 110, optical inspection system 210 is placed in close proximity to a polishing machine. At any time during the polishing process, an operator can remove polishing work holder 212 containing in-process optical specimens 221 from the polishing machine and engage it with interface 216. Optical inspection device 214 is used to complete a visual evaluation of surface quality of the optical specimens contained by the polishing work holder 212 as well as performing a three-dimensional topographical measurement of the optical specimens. Optical specimens that meet specified surface requirements can be removed from polishing work holder 212. Polishing work holder 212, which contains the remaining optical specimens that require further processing, is placed back in the polishing machine.

In FIG. 2, polishing work holder 212 is rotatably attached to interface 216, while interface 216 is fixedly attached to optical inspection device 214. Polishing work holder 212 is rotatable relative to both optical inspection device 214 and interface 216. In particular, polishing work holder 212 is rotatable about work holder central axis 220 as indicated by arrow 219 such that each optical specimen 221 having specimen axis 223 is radially positioned about work holder central axis 220 can come into alignment with the fixed optical axis 218 of optical inspection device 214. In the FIG. 2 configuration, polishing work holder 212 can be moved to discrete positions to locate each specimen axis 223 of each optical specimen 221 in line with optical axis 218.

Figure 3:
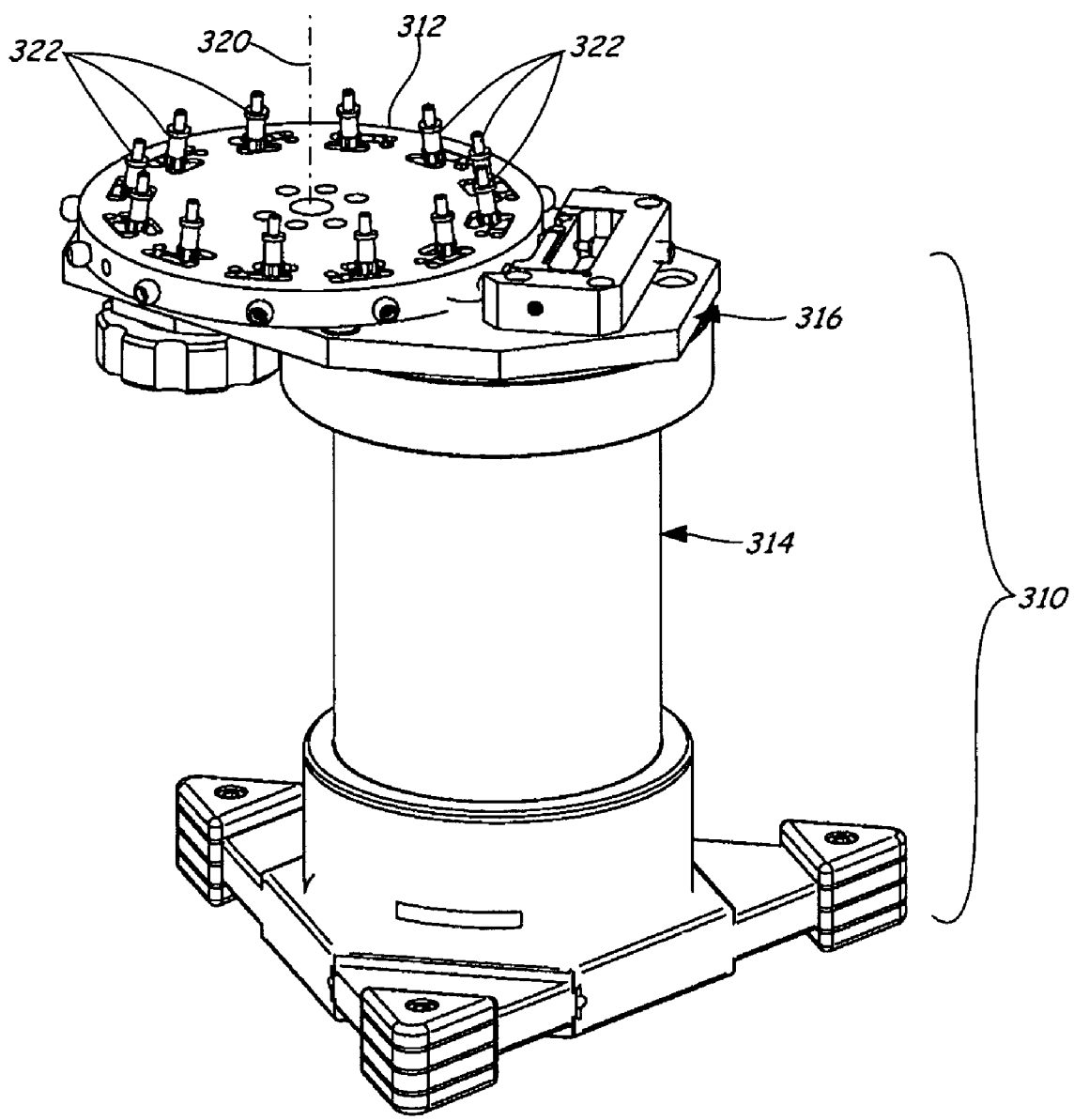
FIG. 3 is top perspective view of an optical inspection system engaged with a polishing work holder under one embodiment.

FIG. 3 is top perspective view of an optical inspection system 310 engaged with a polishing work holder 312 under one embodiment. Optical inspection system 310 is similar to optical inspection system 210 of FIG. 2 and polishing work holder 312 is similar to polishing work holder 212 of FIG. 2 in that polishing work holder 312 is rotatable about a central work holder axis 320, while an interface 316 is fixedly coupled to a fixed optical inspection device 314. Interface 316 is configured to removably engage with polishing work holder 312. Polishing work holder 312 includes a plurality of optical specimens 322. Each of the plurality of optical specimens 322 are radially arranged about central work holder axis 320 and polishing work holder 312 is rotatably coupled to interface 316 about central work holder axis 320.

Figure 4:
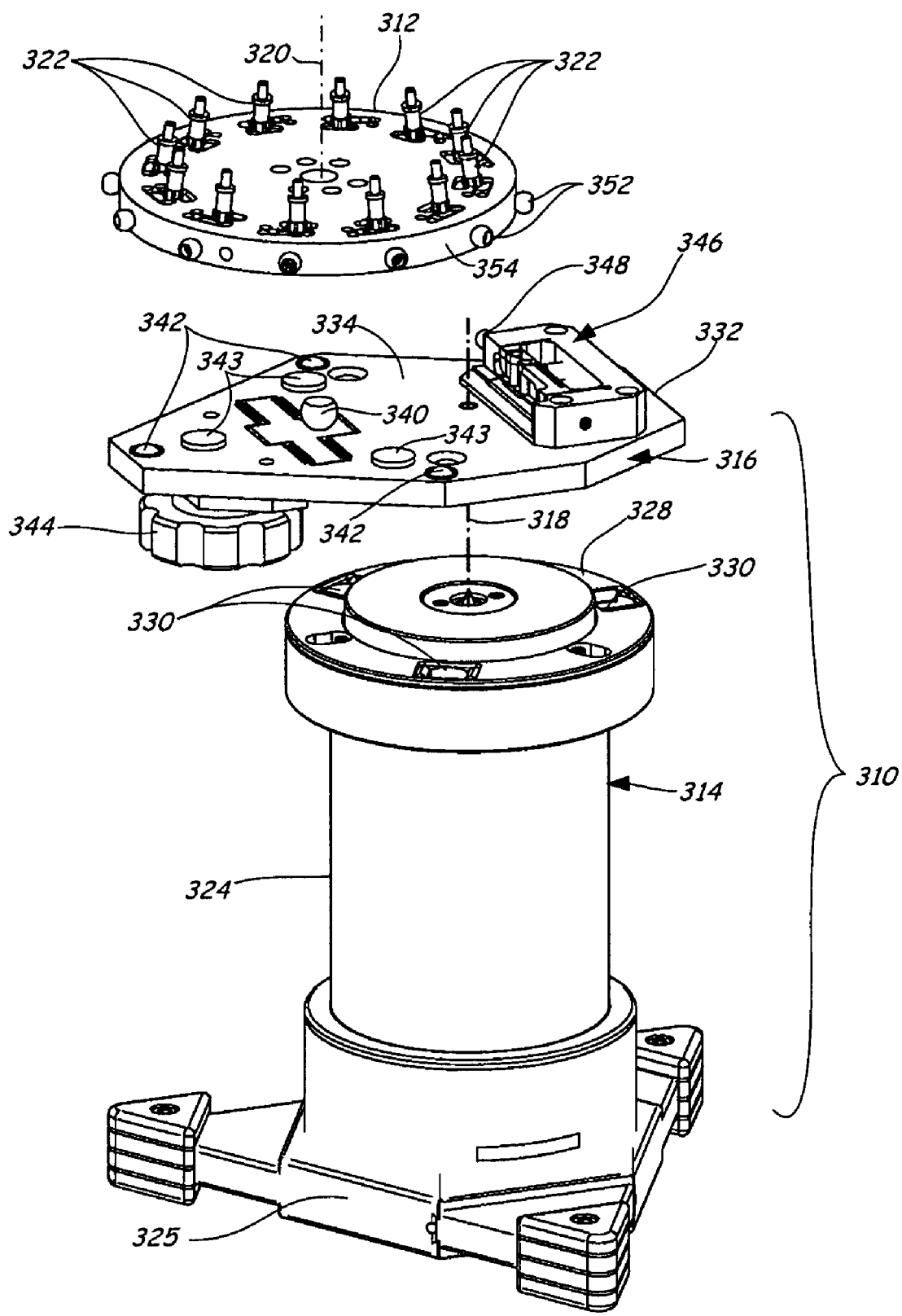
FIG. 4 illustrates a top exploded perspective view of the optical inspection system of FIG. 3 and the polishing work holder of FIG. 3.
Figure 5:
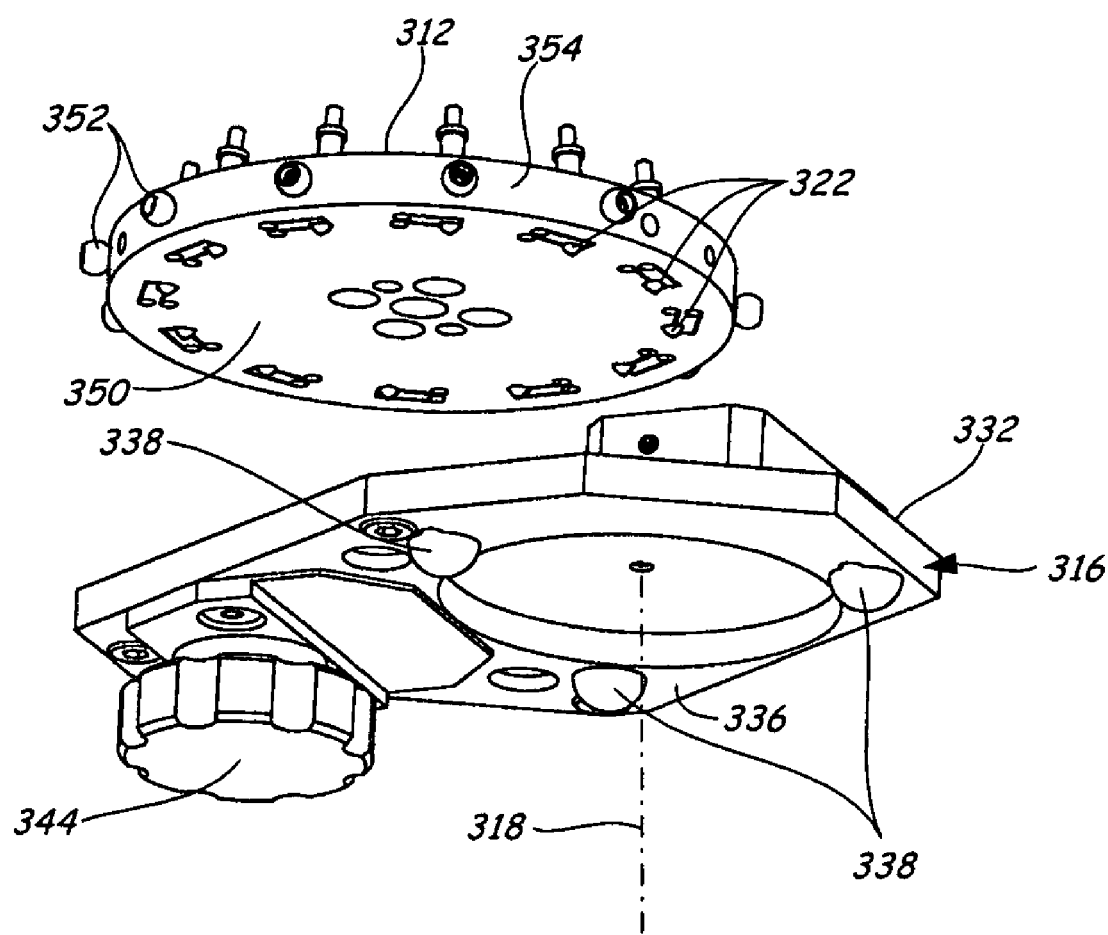
FIG. 5 is a bottom exploded perspective view of a portion of the optical inspection system illustrated in FIG. 3 and the polishing work holder illustrated in FIG. 3.
Figure 6:
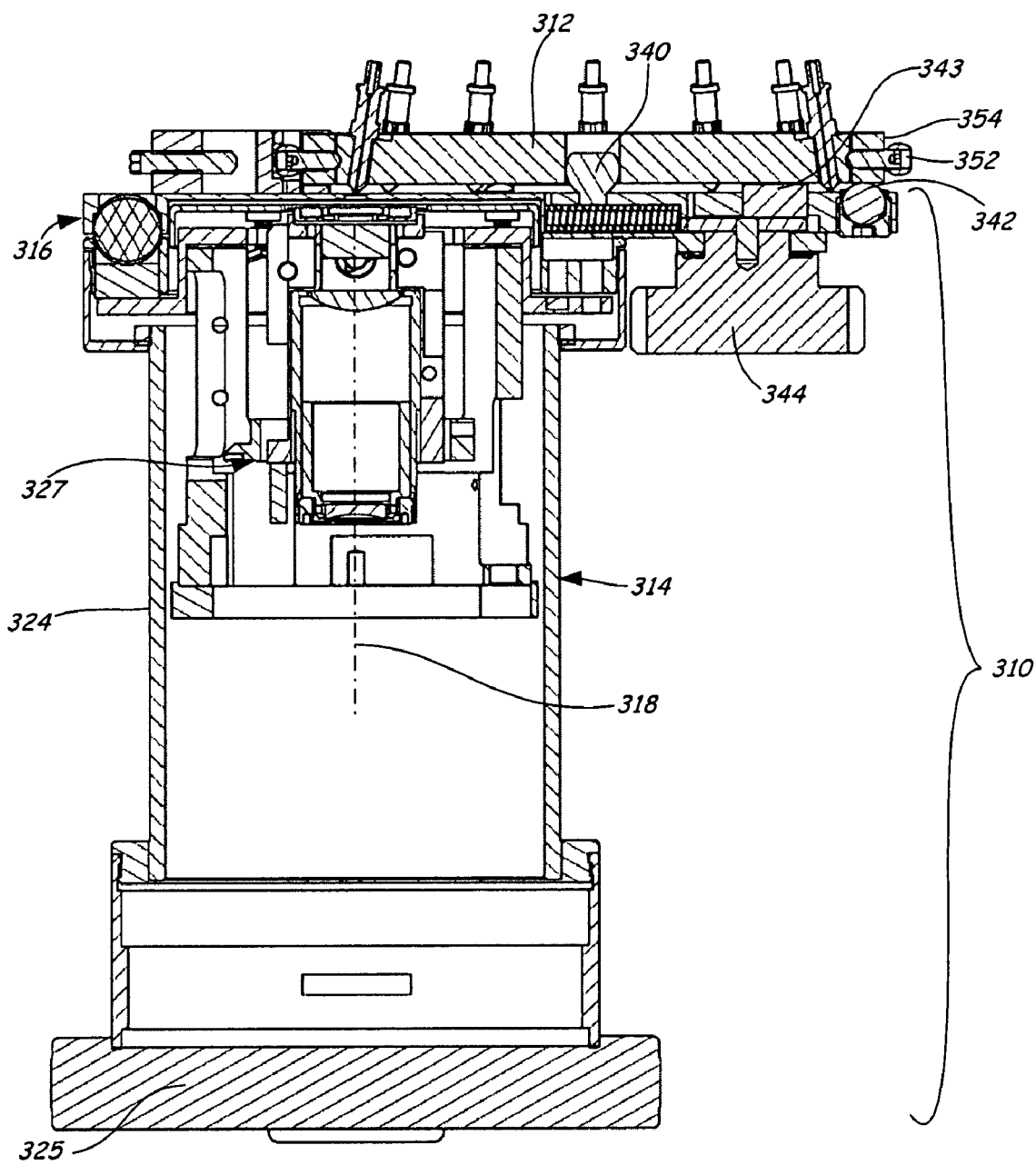
FIG. 6 is sectional view of the optical inspection system and the polishing work holder of FIG. 3.

FIG. 4 illustrates a top exploded perspective view of optical inspection system 310 of FIG. 3 and polishing work holder 312 of FIG. 3. FIG. 5 illustrates a bottom exploded view of interface 316 of FIG. 3 and polishing work holder 312 of FIG. 3. FIG. 6 illustrates a sectional view of optical inspection system 310 and polishing work holder 312 of FIG. 3.

Optical inspection device 314 (FIGS. 4 and 6) is a self contained, non-contact measurement instrument used for the visual inspection and optical interferometric measurement of fiber optic end faces. The highly compact design of the instrument facilitates easy integration into other types of systems, such as polishing systems. Optical inspection device 314 includes a main body 324 (FIGS. 4 and 6). Main body 324 has a slender cylindrical body such that an operator can easily grip it for portable use. Main body 324 includes a removable base 325 (FIGS. 4 and 6). If base 325 is attached to main body 324, then optical inspection device 314 can be supported and placed on a level surface. Optical inspection device 314, as illustrated in FIGS. 3, 4 and 6, has a rather small dimension. In particular, but not by limitation, device 314 includes a height that is approximately 150 mm and a diameter that is less than 200 mm. For example, the diameter of device 314 can be approximately 70 mm. In addition, device 314 is rather light-weight. In particular, but not by limitation, device 102 has a weight that is less than 2.25 kg. For example, device 102 can be approximately 630 g.

Main body 324 is coupled to a plurality of interconnected electrical components (not shown). For example, optical inspection device 314 includes a microprocessor used in conjunction with a connector and a host computer to control the function of and report data from onboard electronics. For example, the connector can be a USB II interface. The host computer includes software configured to display measurement results and to control various electrical functions of the optical inspection device 314. No external power supply is necessary for the optical inspection device 314 since all power can be supplied through the connector. It should be noted, however, that the optical inspection device 314 is not limited to any particular type of connector or any particular type of software.

Main body 324 houses optical imaging components and other electrical components 327 (FIG. 6) that can acquire visual images for surface inspection and acquire interference fringe images for three-dimensional interferometric metrology when evaluating optical specimens 322. The visual images and the interference fringe images are acquired along an optical path located at an optical axis 318 (FIGS. 4, 5 and 6) of the optical inspection device 314. The optical imaging components are based on a Michelson Interferometer arrangement combined with a direct visual imaging capability.

As previously discussed, optical inspection device 314 is capable of operating in two distinct modes. These modes include an interferometric measurement mode and a visual scope mode. Optical inspection device 314 performs separate functions in fiber endface inspection in each mode. The interferometric measurement mode and the visual scope mode are selectable by opening and closing a mechanical shutter. The mechanical shutter, placed in front of the reference mirror, is used to block the optical path to the reference mirror. When the shutter is in an open position, the optical inspection device 314 functions as a Michelson Interferometer. In particular, interference fringes between the reference path and test paths of the interferometer are imaged onto the area array detector. When the shutter is in a closed position and the reference path is blocked, the system functions as a finite conjugate imaging system and the surface under test is directly imaged onto the area array detector.

Main body 324 of optical inspection device 314 also includes an interface receiving surface 328 (FIG. 4). Interface receiving surface 328 includes a plurality of kinematic seats 330 (FIG. 4). In particular, main body 324 of optical inspection device 314 includes three kinematic seats 330. Each kinematic seat 330 includes a magnet. Kinematic seats 330 are used in aligning interface 316 to optical axis 318 of optical inspection device 314 and coupling optical inspection device 314 with interface 316.

Interface 316 includes an interface plate 332 (FIGS. 4 and 5) having a top surface 334 (FIG. 4) and a bottom surface 336 (FIG. 5). Interface plate 332 can be made of a variety of magnetic and non-magnetic materials. For example, interface plate 332 can be made of aluminum. Interface plate 332 aligns with, and magnetically couples to interface receiving surface 328 of optical inspection device 314 by a six-point kinematic contact arrangement. Interface plate 332 includes a plurality of kinematic tooling balls 338 (FIG. 5) attached to bottom surface 336. The alignment of interface 316 with optical axis 318 includes a repeatable positional accuracy of less than two microns. Such precise alignment is accomplished by each ball contacting the two pins in each kinematic seat in exactly two points. The magnets ensure constant contact and load between the kinematic contacts (i.e., each seat 330 to each ball 338). This arrangement facilitates a very simple method of quickly removing interface 316 while guaranteeing a high level of position repeatability. Complex alignment provisions are not needed. In addition, kinematic tooling balls 338 and kinematic seats 330 are radially arranged such that there is only one unique, mechanically stable position that can occur when interface 316 and optical inspection device 314 are assembled. A plane formed by kinematic tooling balls 338 seated in kinematic seats 330 is substantially precisely perpendicular to optical axis 318 of optical inspection device 314.

Interface 316 also includes a moveable or fixed hub feature 340 (FIGS. 4 and 6) and a plurality of spherical surfaces 342 (FIGS. 4 and 6). Hub feature 340 protrudes from top surface 334 of interface plate 332 and is configured to removably engage polishing work holder 312. Polishing work holder 312 is rotatable about hub feature 340 around its central work holder axis 320 (FIG. 4). The plurality of spherical surfaces 342 are aligned in such a manner such that a plane defined by a bottom surface 350 (FIG. 5) of polishing work holder 312 when engaged with the plurality of spherical surfaces 342 and hub feature 340 is parallel to the plane formed by kinematic tooling balls 338 seated in kinematic seats 330. The plurality of spherical surfaces 342 define the position of polishing work holder 312 when seated on hub feature 340. In addition, interface 316 includes a magnet 343 (FIGS. 4 and 6) for each spherical surface 342. Magnets 343 impart a pulling force on polishing work holder 312 to ensure proper contact with spherical surface 342. As illustrated, in one embodiment, interface 316 includes three spherical surface 342 and three magnets 343. Therefore, polishing work holder 312 is magnetically engaged with interface 316

Minor adjustments to the location of hub feature 340 and therefore central work holder axis 320 can be made in the plane perpendicular to optical axis 318. Such minor adjustments can be made using a knob 344 (FIGS. 4, 5 and 6). Upon rotation of knob 344, hub feature 340 will translate in a direction perpendicular to optical axis 318 of optical inspection device 314 and thereby translate the location of the polishing work holder 312 with respect to the optical axis 318. Such minor adjustments in the location of hub feature 340 allow optical specimens 322 to be centered into the field of view or optical path of optical inspection device 314.

Polishing work holder 312 fits on hub feature 340 and rests on the plurality of spherical surfaces 342, of which, in one embodiment, interface plate 332 includes three. After polishing work holder 312 is engaged with interface 316 and minor location adjustments are made of hub feature 340, the plurality of optical specimens 322 supported by the polishing work holder 312 line up with optical axis 318 of optical inspection device 314. Polishing work holder 312 is rotatable about axis 320 on hub feature 340 to bring each optical specimen 322 into a field of view or optical path of optical inspection device 314. To bring each optical specimen 322 into the optical path of optical inspection device 314, interface 316 includes an indexing mechanism 346 (FIG. 4). Index mechanism 346 clocks polishing work holder 312 about hub feature 340. A screw 348 (FIG. 4) attached to indexing mechanism 346 can be used to fine-tune the exact position of each index stop.

Polishing work holder 312 can be made of a magnetic material. The magnetic material of the polishing work holder 312 can be different than the material of interface 316 or the same. Bottom surface 350 of polishing work holder 312 is made substantially perfectly flat to ensure that central work holder axis 320 remains substantially perfectly parallel with optical axis 318 of optical inspection device 314 for every position of which polishing work holder 312 rotates to. For example, bottom surface 350 can be flat within a range of 0-4 microns. To achieve a substantially perfectly flat bottom surface 350, the bottom surface can be machined using precise methods, such as by grinding or lapping. It should be noted that other types of machining techniques can be utilized to achieve the substantially perfectly flat polishing contact surface.

Index stops 352 (FIGS. 4, 5 and 6) are small, equally spaced features that protrude radially from an outer edge 354 (FIGS. 4, 5 and 6) of polishing work holder 312. Index stops 352 engage with indexing mechanism 346 of interface 316 and define discreet stopping positions as polishing work holder 312 is rotated to each position.

Although polishing work holder 312 is described as being particular to optical inspection system 310, it should be recognized that optical inspection system 310 and can be coupled to any pre-existing conventional polishing work holder that is particular to any conventional polishing mechanism for testing fiber ferrules during the polishing process. This allows optical inspection device 314 and interface 316 to be versatile in scope and use. In addition, optical inspection system 310 is cost effective and highly versatile over other types of systems which inspect optical fiber connectors or fiber optic connector ferrules during a polishing process. For example, optical inspection system 310 is cost effective and time efficient over other systems that require manual release of each optical fiber connector from a polishing work holder. In another example, optical inspection system 310 is cost effective and highly versatile over large automated systems which require the use of specific polishing systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical system comprising:
    an optical measurement device that houses optical components that collect surface topography data for computation of three-dimensional images of a plurality of optical specimens along an optical path, wherein the optical path is located along an optical axis of the optical measurement device; and
    an interface coupled to the optical measurement device through a hub feature and configured to be removably and fixedly engaged to a fixed holder that supports a plurality of optical specimens, wherein the optical measurement device moves relative to the holder and the interface by the hub feature in at least one direction to align the optical axis of the optical measurement device with each of the plurality of optical specimens.

2. The optical system of claim 1, wherein the holder is magnetically coupled to the interface.

3. The optical inspection system of claim 1, wherein the optical components of the optical measurement device are further configured to acquire microscope visual images of the plurality of specimens along the optical path.

4. The method of claim 1, wherein the optical measurement device moving relative to the holder and the interface further comprises rotating the optical measurement device about a holder central axis to align the optical axis of the optical measurement device with each of the plurality of optical specimens.

5. A method of testing a plurality of optical specimens, the method comprising:
    providing an optical measurement device having a main body that houses optical components that collect surface topography data for a computation of three dimensional images of the plurality of optical specimens along an optical path, wherein the optical path is located along an optical axis of the optical measurement device;
    engaging a holder with an interface coupled to a main body of the optical measurement device, the holder configured to support the plurality of optical specimens;
    aligning each of the plurality of optical specimens and the optical axis of the optical measurement device by fixing the optical measurement device and the interface while the holder moves in at least one direction relative to the optical measurement device and the interface.

6. The method of claim 5, wherein the optical components of the optical measurement device are further configured to acquire microscope visual images of the plurality of specimens along the optical path.

7. The method of claim 5, wherein the holder moving in at least one direction relative to the optical measurement device and the interface comprises the holder rotating about a holder central axis to align each of the plurality of optical specimens with the optical axis of the optical measurement device.

8. An optical system comprising:
    a fixed optical measurement device having a main body that houses optical components that collect surface topography data for computation of three-dimensional images of a plurality of optical specimens along an optical path, wherein the optical path is located along an optical axis of the optical measurement device; and
    an interface fixedly coupled to the main body of the optical measurement device and removably engaged to a holder that supports a plurality of optical specimens, wherein the holder moves relative to the interface and the fixed optical measurement device in at least one direction to align each of the plurality of optical specimens with the optical axis.

9. The optical system of claim 8, wherein the holder is coupleable to a polishing device remotely located from the optical system such that endface surfaces of the plurality of optical specimens can be polished between measurements.

10. The optical system of claim 8, wherein the holder moving in at least one direction relative to the optical measurement device and the interface further comprises the holder rotating about a holder central axis to align each of the plurality of optical specimens with the optical axis of the optical measurement device.

11. The optical system of claim 8, wherein the interface comprises an interface plate having a top surface and a bottom surface.

12. The optical system of claim 11, wherein the interface comprises kinematic tooling balls attached to the bottom surface of the interface plate that magnetically couple with corresponding kinematic seats located on the main body of the optical measurement device.

13. The optical system of claim 12, wherein the interface comprises a plurality of spherical surfaces attached to the top surface of the interface plate for engaging with the holder, the plurality of spherical surfaces support the holder such that a plane defined by a bottom surface of the holder when coupled to the optical measurement device is parallel with a plane formed by the kinematic tooling balls of the interface.

14. The optical system of claim 11, wherein the interface comprises a mechanical feature that centers the holder in the interface.

15. The optical system of claim 14, wherein a hub feature on the interface is configured to move the holder in a direction perpendicular from the optical axis.

* * * * *